Patented Mar. 31, 1931

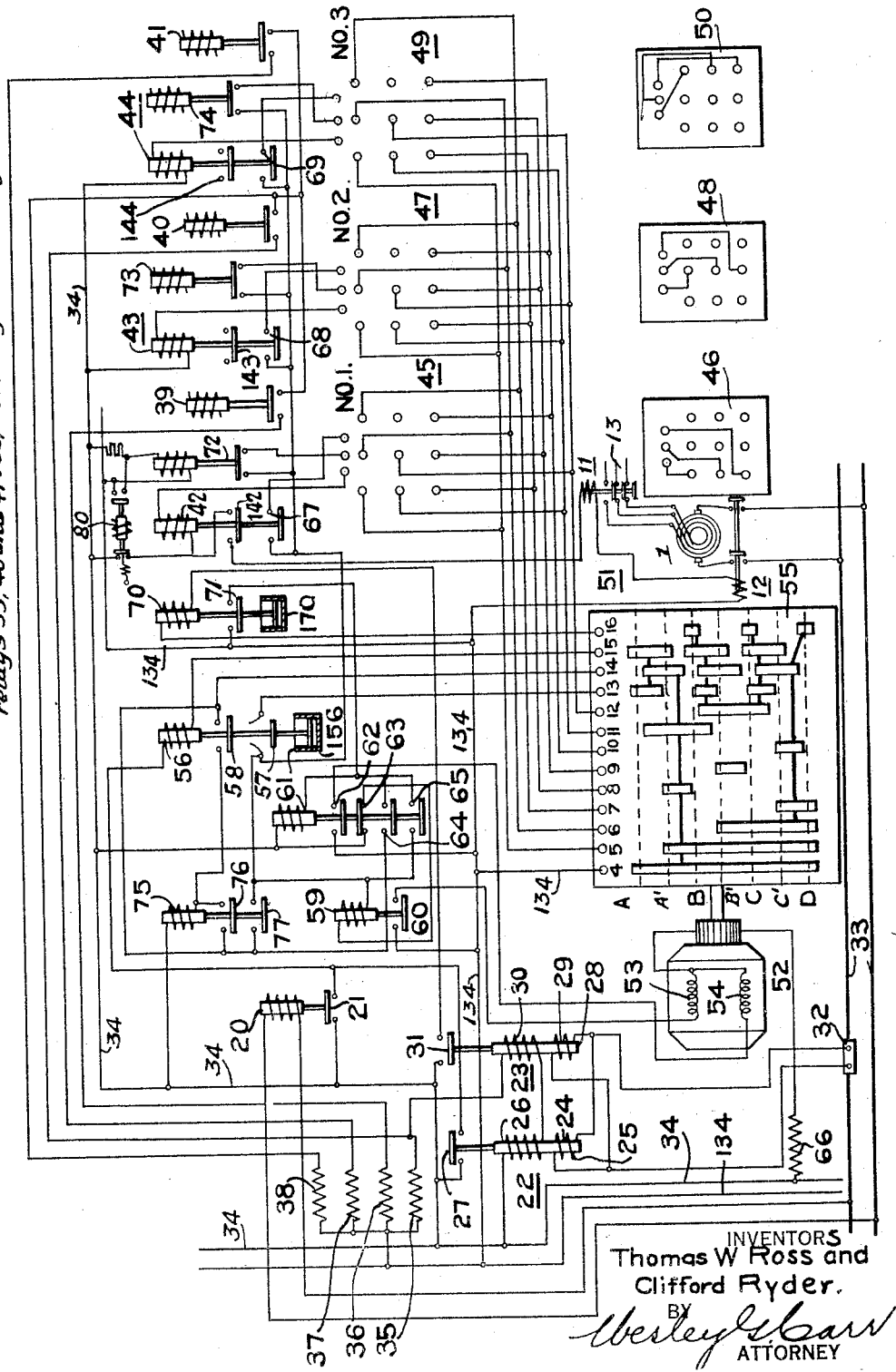

1,798,704

UNITED STATES PATENT OFFICE

THOMAS WYLIE ROSS, OF STRETFORD, MANCHESTER, AND CLIFFORD RYDER, OF FLIXTON, ENGLAND, ASSIGNORS TO WESTINGHOUSE ELECTRIC AND MANUFACTURING COMPANY, A CORPORATION OF PENNSYLVANIA

ELECTRICAL CONTROL APPARATUS

Application filed June 16, 1927, Serial No. 199,172, and in Great Britain June 22, 1926.

This invention relates to the control of a plurality of dynamo-electric machines or other translating devices such as transformers, vapor converters, etc., in an electric power station or substation.

In such a station in which a plurality of machines are arranged to feed common bus-bars supplying a varying load it is desirable, in the interests of efficiency and economy, that only that number of machines necessary to supply the load should operate and that the number of machines operating should be automatically varied in accordance with the load on the bus-bars.

According to the invention in a station containing a plurality of dynamo-electric machines, load responsive relays are provided and are arranged to operate a controlling device, such as a drum controller, so that the machines are started and closed down in a predetermined sequence one at a time in response to increasing or decreasing load upon the station. The relays may be arranged to be differentially responsive to the load current on the station bus-bars and to the number of machines in operation. Further the relays may be arranged so that an overload relay is used to initiate the starting up of machines when the load current exceeds an amount permissible for the number of machines in operation and an underload relay used for initiating the closing down of machines when the load is less than is economical for the number of machines already in operation.

In such a station, provision may be made for interchanging the connections between the controlling apparatus and the starting equipments of the several machines so that the sequence in which the several machines are started and closed down may be changed at will. Where the controlling apparatus is a drum controller this may be operated by an electric motor which is arranged to be connected by the overload relay to run in a forward direction so as to initiate the starting of a machine or machines and by the underload relay to run in a reverse direction to initiate the closing down of a machine or machines.

When lock-out relays are provided to prevent any one or more of the machines in the sequence from starting, contacts may be provided on the lock-out relays by which a circuit, otherwise automatically closed, will be opened in the event of a machine being locked out. The drum controller will then continue its rotation, without delay, beyond the starting position for the locked out machine to the starting position for the next following machine in the sequence. In the event of a machine in the sequence failing to start, though not locked out, the drum controller may be arranged to move, after a sufficient interval of time has elapsed for the machine to be started, to the position for initiating the starting of the next machine in the sequence.

To enable the invention to be more clearly understood one arrangement thereof which may be applied to an automatic substation having a plurality of dynamo-electric machines, such as rotary converters, provided with starting equipments of any suitable form will now be described with reference to the accompanying drawing in which the figure shows a diagram of connections of a system for the sequence control of three machines.

For the sake of simplicity only one of the dynamo-electric machines, 1, and the main starting relays 42, 43 and 44 for three dynamo-electric machines have been shown in the drawing, but it is assumed that the energization of the corresponding relay for each machine initiates, by the closing of contact 142, 143 or 144 respectively, the operation of automatic starting equipment of some well-known type. Only the main circuit-breakers 11 and 12 for connecting the unit 1 to the alternating-current supply circuit 13 and to the direct-current load circuit 33 are shown in the drawing. For changing the sequence of operation of the machines sequence plugs 46, 48 and 50 are provided with co-operating sockets 45, 47 and 49, the plugs being interchangeable for the purpose of the order in which the starting relays 42, 43 and 44 are energized.

The operations are controlled by means of two relays, an overload relay 22 and an underload relay 23 and a controlling device 51, the overload and underload relays 22 and 23 being similar in construction. The overload relay 22 has a single plunger 24 which is operated differentially by the action of two coils 25 and 26 to close the contact 27, when the pull exerted by the coil 25 is greater than that exerted by the coil 26, and the underload relay 23 has a plunger 28 which is operated differentially by the action of two coils 29 and 30 to close the contact 31, when the pull exerted by the coil 30 is greater than that exerted by the coil 29. The coils 25 and 29 of these relays are energized in parallel from a summation shunt 32 which is connected in the main bus-bars 33 so that the pull exerted by these coils is proportional to the load on the station. The coils 26 and 30 are energized in series from auxiliary bus-bars 34 and 134, which supply energy for the control system, through a permanent resistance 35 in parallel with one or more resistances 36, 37 and 38 according to the number of machines in operation as will be described hereinafter. A plurality of auxiliary relays 39, 40 or 41 each having contacts associated one with each machine and in series with the resistances 36, 37 and 38 respectively are arranged by any suitable circuit connections, so that when the corresponding machine is in operation and supplying energy to the main bus-bars, the contacts are closed to insert the corresponding resistance 36, 37 or 38 in parallel with the resistance 35. Thus the number of resistances in parallel corresponds to the number of machines in operation plus the permanent resistance 35 and consequently the pull exerted by the coils 26 and 30 which, as explained above, are energized in series circuit with these paralleled resistances, is proportional to the number of machines in operation. The controlling device 51 comprises a motor 52 having forward and reverse field windings 53 and 54 arranged to drive a drum controller 55 having contacts thereon numbered successively 4 to 16.

The operation of the first machine in the station may be initiated either manually or by remote control in any well-known manner in the case of an isolated station; when the station forms part of a network the first machine may be arranged to be started when the voltage of the main bus-bars drops below a certain predetermined value by means of an under voltage relay shown at 20, the coil of which is connected to the bus-bars 33.

Describing now the operation of the system it will be assumed that the voltage on the bus-bars 33 drops to such an extent that relay 20 is de-energized thereby causing its armature 21 to complete a circuit which may be traced from bus-bar 34, through armature 21 of relay 20 in its de-energized position, the winding of a time delay relay 56, contact 15 of drum controller 55 in its position A, and contact 4 to bus-bar 134. The relay 56 is a time delay relay conventionally shown with a dash pot 156 and having two sets of contacts one set 57 of which makes contact after an initial time delay and the second set 58 of which makes contact after a further time delay provided the relay has not been de-energized in the meantime. The completion of the above traced circuit causes relay 56 to be energized and, after a time delay, to operate to complete a circuit at contact 57 which may be traced from bus-bar 34 through back contact 63 of a contactor 61 in its de-energized position, winding of a contactor 59, contact 57 of relay 56, contact 13 of the controller 55 and contact 4 to bus-bar 134. The completion of this circuit energizes contactor 59 which closes its armature 60 to complete a circuit from bus-bar 34 through a resistance 66 the armature of motor 52, forward field winding 53 and contact 60 of contactor 59 to bus-bar 134. With its energizing circuit thus completed the motor 52 starts to rotate the drum controller in a forward direction from the "preparatory" position A which it normally occupies, and after it has rotated through a certain angle to the "operative" position A' for contactor 42, a circuit is completed from bus-bar 34 through the winding of main starting relay 42 of machine No. 1, socket 45 and plug 46, contact 5 of the controller 55 and contact 4 to bus-bar 134. The main starting relay 42 is energized over this circuit to initiate the automatic operation of the starting equipment for machine No. 1 which is typified by the contactors 11 and 12. At the same time as this circuit is completed the circuit for contactor 59 is broken at contact 13 of the controller 55 and the motor 52 stops rotating in the "operative" position A' for contactor 42. As soon as the main starting relay 42 operates a second circuit is completed for contactor 59 which may be traced from bus-bar 34, back contact 63 of contactor 61 in its de-energized position, winding of contactor 59, contact 67 of relay 42, in its energized position, plug 46, socket 45, contact 8 on controller 55, contact 4 back to bus-bar 134 the contactor 59 being thereby re-energized and the motor is again rotated until contact 8 breaks and de-energizes contactor 59 bringing the drum to a standstill in position B, which is the "preparatory" position for contactor 43.

When the starting equipment has operated and machine No. 1 is connected to the main bus-bars 33 an auxiliary relay 39 is de-energized by any known circuit arrangement, and its contact member is closed to complete a circuit for resistance 36 in parallel with resistance 35 so that the overload and underload relays 22 and 23 have their coils 26 and 30 energized by a current which corresponds with the fact that there is one machine connected to the main bus-bars.

It will be noted that in position B of the drum controller 55, contact 4 and contact 13 are again in a position which prepares a circuit for contactor 59 to be completed by the operation of time delay relay 56.

If the load on the bus-bars increases to such an extent that it is greater than that which can be supplied by one machine, then the coil 25 on the overload relay 22 is energized to attract the solenoid 24 against the pull of coil 26 so as to close contact 27 of relay 22 which again completes a circuit for time delay relay 56. The operation of relay 56 causes the motor 52 to rotate the drum controller 55 to position B' in which it completes the energizing circuit for the starting relay 43 of machine No. 2 through plug 48, socket 47 and contact 6 on the controller 55. When starting relay 43 operates the controller 55 is again rotated, as a circuit for contactor 59 is completed through contact 68 of relay 43 and contact 9 of the controller 55, until it reaches position C when the circuit for contactor 59 is broken at contact 9 of the controller. When machine No. 2 is connected to the main bus-bars 33 the contact member of relay 40 is closed to connect resistance 37 in parallel with resistances 35 and 36 so that the current through the relay coils 26 and 30 will correspond to two machines being connected to the bus-bars 33.

Thereafter, if the load on the bus-bars increases further, the system operates in a similar manner to move the controller from position C to position D during which main starting relay 44 is energized and machine No. 3 is started up.

Provision is made on the controller shown in the drawing for three machines only and three main starting relays only are shown, but it will be appreciated however, that the controller can be extended to permit of the sequence control of any desired number of machines.

When the controller drum 55 reaches the last position namely, D as shown in the figure, fixed contact 13 does not make contact with a drum contact so that the controller cannot be further rotated in a forward direction if the relay 22 should operate.

Considering the sequence of operations which occur when the load decreases to less than that which is economically supplied by the machines in operation and it becomes desirable for one of the machines to be shut down, it will be assumed that the controller 55 is in the position D. Relay 23 operates by reason of the fact that the pull of coil 30 is greater than that of coil 29 and contact 31 is closed to complete a circuit which extends from bus-bar 34 through contact 31, winding of a reverse time delay relay 70 conventionally shown with a dash pot 170, contact 16 of the drum controller 55 and contact 4 to bus-bar 134.

After a time delay which may for convenience be adjustable up to 20 minutes so that a machine is not shut down by reason of a temporary fluctuation in the load, relay 70 operates to complete at its contact 71 a circuit from bus-bar 34 through the winding of reverse contactor 61, contact 71 of relay 70 in its energized position back to bus-bar 134. Contactor 61 operates to complete a circuit from bus-bar 34 through resistance 66, armature of the motor 52, reverse field winding 54, contact 62 of contactor 61, in its energized position to bus-bar 134. The motor 52 starts to rotate in the reverse direction and after it has rotated through a certain angle contact 16 of the controller 55 is opened to de-energize relay 70 which in turn opens the circuit for contactor 61 at its contact 71.

In the meantime, however, contact 14 of the controller 55 completes an alternative holding circuit for contactor 61 extending from bus-bar 34 through the winding of contactor 61, front contact 64 of that contactor in its energized position, contact 14 and contact 4 to bus-bar 134. The motor 52 therefore continues to rotate and thereby opens contact 7 of the controller 55 to de-energize the main starting relay 44 of machine No. 3. When the controller 55 reaches position C, contact 14 opens to de-energize contactor 61 and the drum stops rotating in position C ready either to shut down the next machine if the load drops still further or to start up again the machine which has just been shut down should the load increase sufficiently.

When the machine No. 3 is shut down the contact member of relay 41 is opened to remove resistance 38 from the circuit for energizing coils 26 and 30 of the overload and underload relays 22 and 23, so that the operation of these relays is still dependent upon the relation between the load on the main bus-bars and the number of machines in operation.

Subsequent operations of the drum in accordance with further decreases of load are the same as that just described.

If any machine in the sequence is locked out by means of a lock-out relay, such as that shown at 80, provision is made by means of additional relays 72, 73, 74 controlled by the respective lock-out relays, only one of which is shown on the drawing, for rotating the drum 55 of the device 51 past the starting position of the locked out machine into a corresponding position to the next following machine in the sequence so that the starting up of this machine may take place in the usual way. The lockout relays may be energized in response to any predetermined abnormal condition. If, for example, the drum controller is in position B and machine No.

2 is locked out, the initiation of the operation of the system when the overload relay 22 operates is of course the same as under normal conditions, but as soon as the controller 55 has moved through a small angle a holding circuit for contactor 59 is completed from bus-bar 34, through the back contact 63 of contactor 61 in its de-energized position, the winding of contactor 59, contact of the relay 73 of machine No. 2, which relay is short-circuited by the operation of the lockout relay (not shown), plug 48 and socket 47, contact 12 of controller 55 and contact 4 to bus-bar 134. The drum continues to rotate until the circuit of contactor 59 is broken at contact 12 in which position the circuit through contact 7 is completed whereupon the main starting relay 44 for machine No. 3 operates, and in so doing completes another circuit through contact 10 for the contactor 59 and the operation of the drum continues until it reaches the position D. It will be seen therefore, that machine No. 3 is connected in place of machine No. 2 which has been locked out.

Similarly, when the drum is moving back from, for example, position D when machine No. 2 is locked out, the operation of the drum is initiated in the usual way for backward rotation and then after the motor 52 has rotated the controller 55 through a certain angle and thereby opened the circuit of main starting relay 44 of machine No. 3 at contact 7 of the controller a second holding circuit for contactor 61 is completed at contact 12 prior to the breaking of the first holding circuit at contact 14. This second holding circuit extends from bus-bar 34, the winding of contactor 61, contact 65 of contactor 61 in its energized position, contact 73 of the lock-out relay of machine No. 2 plug 43 and socket 47, contact 12 of the controller and contact 4 to bus-bar 134. The motor 52 therefore continues to rotate until the controller reaches position B when the above traced holding circuit is broken at drum contact 12.

Should a machine which is not locked out fail to start if, for example, the control switch of a machine has been left open, one of the control fuses has blown, or the coil of the main starting relay is open circuited provision is made to cause the drum 55, after sufficient time has been allowed to start up the machine to move to the starting position for the next machine, and, after the usual time interval, to start up that machine in place of the one which failed to start. This operation is as follows: Assuming that the relay 20 operates and the movement of the drum 51 is initiated in the manner hereinbefore described, when the drum has moved through a predetermined distance the circuit for the main starting relay 42 is completed and the contactor 59 de-energized at the contact 13. If the main control relay 42 fails to operate, the holding circuit for contactor 59 is not completed at contact 67 and the motor 52 remains de-energized. However, the circuit for the time delay relay 56 is still complete through contact 15 of the controller 55. Hence, after a predetermined interval this relay will operate further to complete a circuit at its contact 58 and thereby energize relay 75 over a circuit extending from bus-bar 34 through the winding of relay 75, contact 58 of relay 56, contact 14 of the controller 55 and contact 4 to bus-bar 134. Relay 75 operates to complete a holding circuit for itself at contact 76 and at contact 77 an alternative energizing circuit for contactor 59 extending from bus-bar 34, back contact 63 of contactor 61, winding of contactor 59, contact 77 of relay 75, contact 14 of the controller 55 and contact 4 to bus-bar 134.

Contactor 59 being again energized, the motor 52 rotates until contact 14 of the controller breaks the circuit for contactor 59 when the drum is in position B. It will be noted that the circuit for time delay relay 56 is open when the controller moves off contact 15, but as relay 75 has closed a holding circuit for itself at contact 76 the drum will continue to rotate as explained above.

As relay 56 has been de-energized the operation of the drum from position B will be initiated by the energization of relay 56 in response to the operation of relay 22 or relay 20 as the case may be.

As hereinbefore mentioned, the sequence plugs are provided so that the machines may be connected so as to start up in any desired sequence and it will be appreciated from a consideration of the drawing and the foregoing description that the plug 46 when placed in any selected socket will ensure that the starting relay associated with that socket will be energized first and plugs 48 and 50 will similarly cause the starting relay associated with the socket in which they are inserted to be energized second or third respectively. In place of plugs and sockets a multi-contact switch or switches of any suitable form may be employed.

The system herein described is readily applicable to the starting up of rotary converters or motor converters in a substation as and when required but may also be employed for starting prime movers driving dynamo machines in which case the main starting relays will control or operate by suitable gear the valves governing the supply of motive fluid to said prime movers. This system is applicable, furthermore, to multi-unit translating stations of all kinds, regardless of the nature of the translating devices.

It will be appreciated that the arrangement herein described is given by way of example only and that many modifications may be made without departing from the scope of the invention.

We claim as our invention:—

1. An automatic translating station comprising a plurality of translating units, a load circuit, a supply circuit, a plurality of contactors for causing the connection of the units to said circuits, means for successively actuating said contactors including two differential relays having opposed windings energized respectively in proportion to the station load and the number of the translating units connected to the load circuit, a drum controller and a motor for operating said controller, said motor being controlled by said differential relays, and means including plug and socket connectors for governing the order in which the contactors are actuated in response to changes in the station load.

2. An automatic translating station comprising a load circuit, a supply circuit, a plurality of translating units, contactors for controlling the starting of said units and the connection thereof to said circuits, means for causing the successive actuation of said contactors including a rotatable drum controller, a motor for actuating said controller in two directions, means for controlling the order of the actuation of said contactors by said controller comprising interchangeable plug and socket connectors, an undervoltage relay for initiating the operation of said drum controller and differential relays having opposing windings, energized respectively in accordance with the total load on the station, and the number of the translating units in operation, for controlling the further operation of said controller in both directions, depending upon the variations in the station load.

3. An automatic translating station comprising a plurality of translating units, a load circuit, a supply circuit, contactors for connecting said units to said circuits, a drum controller for successively actuating said contactors, a motor for operating the controller, relays responsive to the difference between the station load and the number of connected translating units for controlling said motor, lockout relays for said contactors to prevent operation of the latter by the drum controller upon the occurrence of predetermined abnormal conditions, and auxiliary relays, controlled by said lockout relays, operative when any contactor is locked out, to cause the continued rotation of said drum controller to operate the contactor next in order of operation to the locked-out contactor.

4. An automatic station comprising a plurality of translating units, a load circuit, a supply circuit, contactors for connecting said units to said circuits, means for successively actuating said contactors including a drum controller, a motor for rotating said controller and relays responsive to the difference between the station load and the number of connected translating units, for controlling said motor, and a time-delay relay, also controlled by said switch whereby the time-delay relay is energized prior to the energization of each of said contactors, and de-energized subsequent to the de-energization of said contactors, said time-delay relay having a switch which is adapted to be closed when any one of the contactors fails to operate within a definite time after being energized, for causing the continued rotation of said controller to actuate the next contactor in the order of operation.

5. In an automatic station, a supply circuit, a load circuit, a plurality of translating units, a plurality of contactors for connecting said units between said circuits, means for effecting the successive actuation of said contactors comprising a drum controller having a preparatory and an operating position for each of said contactors, a motor for rotating said controller, said controller normally occupying the preparatory position for one of the contactors in the operating sequence, a relay operative when the conditions of the load circuit reach a predetermined state, to energize a time-delay relay and to start the motor to move the controller into the operating position for the next contactor whereby said contactor is actuated, and the controller stopped, a switch closed by the actuation of said contactor for causing further rotation of said controller, whereby said time-delay relay is de-energized and the controller stopped in the preparatory position for the next contactor in the operating sequence, said time-delay relay having a switch adapted to be closed if the relay is not de-energized by the actuation of any one of the contactors within a definite time from the energization of said contactor, for causing the controller to be actuated to the preparatory position for the next contactor in the sequence.

6. An automatic translating station including a plurality of translating units, a load circuit and a supply circuit, means for connecting said units to said circuits and means for successively actuating said connecting means comprising a differential relay responsive to the difference between the station load and the number of connected translating units and contact-making means controlled by said relays.

7. In an automatic station, the combination with a load circuit, a supply circuit and translating units, automatic means including differential relays and a drum controller for successively effecting the connection of said units between said circuits in a predetermined sequence and for disconnecting said units in the reverse order in accordance with changes in the load on the station, means for locking out any unit on the occurrence of predetermined abnormal conditions and means for causing the drum controller to effect the substitution of the next unit in the sequence for the locked-out unit.

8. In an automatic station, in combination, a load circuit, a supply circuit, a plurality of translating units disposed to be connected between the circuits, means operable to connect the translating units to the circuits in a definite sequence, means for changing the sequence of connection, said connecting means being disposed to effect the disconnection of the translating units in the reverse order of their connection, and means differentially responsive to the current flowing in the load circuit and a control voltage varied in accordance with the number of connected translating units for controlling the operation of the connecting means.

9. In an automatic station, in combination, a load circuit, a supply circuit, a plurality of translating units disposed to be connected between said circuits, means for connecting the translating units to the circuits individually, a motor-operated switching device for effecting the successive operation of the connecting means, said switching device being disposed to effect the disconnection of the translating units from the circuits in the reverse order of their connection, and means differentially responsive to the current in the load circuit and a control voltage which varies in proportion to the number of translating units connected to the circuits for controlling the operation of the switching device, thereby to effect the automatic connection and disconnection of the units in accordance with the variation of the current in the load circuit.

10. In a control system for a multi-unit translating station, in combination, a load circuit, a supply circuit, a plurality of translating units, means for individually connecting the translating units between the circuits, means operable to effect the successive operation of the individual connecting means, and means differentially responsive to the current in the load circuit and to a control voltage varied in accordance with the number of translating units in service for automatically controlling the operation of the means for effecting the successive operation of the individual connecting means in response to the variation of the current in the load circuit.

In testimony whereof we have hereunto subscribed our names this 25th day of May, 1927.

THOMAS WYLIE ROSS.
CLIFFORD RYDER.